United States Patent [19]
Saddow et al.

[11] Patent Number: 5,596,438
[45] Date of Patent: Jan. 21, 1997

[54] PHOTOCONDUCTIVE SPREAD-SPECTRUM COMMUNICATIONS SYSTEM

[75] Inventors: Stephen E. Saddow, Laurel; Eric Funk, Silver Spring; Louis J. Jasper, Fulton; Chi H. Lee, Potomac, all of Md.

[73] Assignee: The United States of America as represented by the Secretary of the Army, Washington, D.C.

[21] Appl. No.: 530,398

[22] Filed: Sep. 21, 1995

[51] Int. Cl.[6] .......................... H04B 10/00; H04B 15/00; H04K 1/00
[52] U.S. Cl. .................. 359/154; 359/111; 359/145; 359/180; 359/189; 375/200
[58] Field of Search ...................... 359/111, 145, 154, 172, 180–181, 189, 193, 257; 375/200; 343/721

[56] References Cited

U.S. PATENT DOCUMENTS

| | | |
|---|---|---|
| 4,380,391 | 4/1983 | Buser et al. ................... 356/5 |
| 4,441,186 | 4/1984 | Erickson ...................... 372/19 |
| 5,157,542 | 10/1992 | Fitzmartin et al. ............. 359/278 |
| 5,264,960 | 11/1993 | Glance ........................ 359/344 |
| 5,301,206 | 4/1994 | Ishigaki et al. ............... 375/200 |
| 5,499,265 | 3/1996 | Dixon et al. .................. 375/200 |
| 5,499,267 | 3/1996 | Ohe et al. .................... 375/200 |

OTHER PUBLICATIONS

Withington et al., "An Impulse Radio Communications System", pp. 13–120.

Primary Examiner—Wellington Chin
Assistant Examiner—Kinfe-Michael Negash
Attorney, Agent, or Firm—Freda L. Krosnick; Frank J. Dynda

[57] ABSTRACT

A photoconductive spread-spectrum communications system that includes a transmitter and a receiver. The transmitter includes an oscillating laser, a Pockels' cell, a delay cell, a photoconductive switch, and an antenna for transmitting an electromagnetic spread-spectrum signal. The receiver includes an oscillating laser, a Pockels' cell, an antenna for receiving a spread-spectrum signal, a photoconductive switch, a filter, and a threshold detector for regenerating the signal contained within the spread-spectrum transmission.

11 Claims, 3 Drawing Sheets

PHOTOCONDUCTIVE SPREAD-SPECTRUM COMMUNICATIONS SYSTEM

TECHNICAL FIELD OF THE INVENTION

The present invention pertains to a spread-spectrum communications system, and, more particularly, to an optical spread-spectrum communications system.

BACKGROUND OF THE INVENTION

Spread-spectrum communications systems spread the intended information signal over a wide band of frequencies and/or time segments in order to hide the signal from unintended recipients. Typically, a pseudo-random code known only by the sender and the intended recipient is used to spread the information signal. If the bandwidth over which the signal is spread is large enough, unintended recipients that do not know the pseudo-random code may not be able to distinguish the spread signal from a noise signal.

The traditional means of producing a spread-spectrum signal is to begin with a continuous wave (CW) carrier. This carrier is then modulated by a high data-rate pseudo-random code and a lower data-rate information signal. Various modulation schemes are used (i.e., phase-shift keying). Due to the high data-rate of the pseudo-random code, the signal acquires a large bandwidth. The rate of the code determines the bandwidth of the transmitted signal. A high code rate leads to a high bandwidth transmission.

In order to recover the information signal, the intended receiver must cross-correlate the spread-spectrum signal received using the same pseudo-random code in the same sequence used in the transmitter to spread the transmission. If the energy per unit bandwidth of the transmitted signal is below the average noise level seen by the receiver, an uncorrelated receiver (i.e., a receiver that does not use the same pseudo-random code and/or sequence) will not detect the presence of a spread-spectrum signal. However, a receiver that cross-correlates the transmission will exhibit an improvement in signal to noise ratio (SNR) over the uncorrelated receiver. The improvement in SNR is limited by the process gain, Gprocess, which is given by:

$$Gprocess = BW/Rinfo,$$

where BW is the bandwidth over which the transmitted signal was spread and Rinfo is the information data rate (i.e., the data rate of the signal being spread). Hence, even if an uncorrelated receiver is not able to recover the transmitted signal, a correlated receiver may well be able to recover the signal by utilizing the process gain. The correlated receiver, however, requires the use of the pseudo-random code used by the transmitter. If the secrecy of the code is maintained between the sender and intended recipient then unintended recipients of the spread-spectrum transmission may not be able to recover the underlying signal. Typically, electronic parts are used to realize the above-identified approach. The primary problem with using such devices is the relatively slow speed of electronic devices. The speed limitation appears in both the transmitter and the receiver.

The bandwidth of the transmitted signal is determined by the data rate of the pseudo-random code used to spread the signal. But more importantly, the receiver must be able to perform a complicated electronic cross-correlation at a pace in keeping with the rate of the code. The use of high speed electronic devices is not necessarily a practical solution due to the high power consumption and complexity associated with such devices.

The present invention discloses an optical solution to the above-identified problem. Instead of using a narrow-band electromagnetic signal, a wideband optical signal is used. This wideband optical signal is then spread by a pseudo-random code. A time delay is added as a means of modulating an information signal onto the spread-spectrum optical signal. The process gain of the present invention is determined by the wideband optical signal rather than the rate of the pseudo-random code.

The present invention discloses a time-hopped ultra wideband optical spread-spectrum communications system. The present invention exploits the jitter-free operation and high repetition rate which is possible with photoconductive switching. The present invention employs a oscillating laser to trigger a fast photoconductive switch, a photoconductive switch to convert the wideband optical signal into an electromagnetic signal which can be broadcast, and an antenna for broadcasting the electromagnetic signal.

The present invention uses optical devices in place of some electronic devices in order to achieve a higher data rate, higher isolation, and higher immunity to electromagnetic interference.

An article entitled "An Impulse Radio Communications System," authored by Paul Withington, II and Larry W. Fullerton, published in a book entitled Ultra-Wideband Short-Pulse Electromagnetics, Plenum Press, 1993, discloses an impulse radio that uses pulse position modulation, where the interval between pulses is based on an information component and a pseudo-random code component. The radio disclosed in this article is based in electronics and, therefore, cannot achieve the high data rates as the present invention which is a spread-spectrum system based in optics. U.S. Pat. No. 4,441,186, entitled ELECTRONICALLY SWITCHABLE MULTIWAVELENGTH LASER SYSTEM, discloses the use of a Pockels' Cell to switch between two wavelengths of a laser. The present invention discloses the use of a Pockels' Cell to select, under the control of a pseudo-random code, various pulses from a pulse train of an oscillating laser. The present invention then adds an information signal to the output of the Pockels' cell. The additive signal is then transmitted to a recipient who knows the pseudo-random code. U.S. Pat. No. 4,441,186 does not disclose such a spread-spectrum communications system.

U.S. Pat. No. 5,264,960, entitled OPTICAL WAVELENGTH SHIFTER, discloses a method of impressing a signal onto an optical signal at one wavelength and then converting this optical signal to a optical signal of a different wavelength. The present invention spreads an intended signal over one time-hopped wavelength of an optical signal. U.S. Pat. No. 5,264,960 does not disclose such a spread-spectrum communications system.

U.S. Pat. No. 4,380,391, entitled SHORT PULSE CO2 LASER FOR RANGING AND TARGET IDENTIFICATION, discloses the use of a Pockels' Cell to chop a laser beam into a train of nanosecond pulses which are then transmitted. The reflections from these pulses are categorized in order to identify the object off of which the transmitted signal was reflected. The present invention discloses the use of a Pockels' Cell to select, under the control of a pseudo-random code, various pulses from a pulse train of an oscillating laser. The present invention then adds an information signal to the output of the Pockels' Cell. The additive signal is then transmitted to a recipient who knows the pseudo-random code. U.S. Pat. No. 4,380,391 does not disclose such a spread-spectrum communications system.

U.S. Pat. No. 5,157,542, entitled OPTICAL FM MODULATION SYSTEM, discloses an optical modulation system. The laser beam is modulated by a signal that has been processed by an integrator. The result is that the laser beam is frequency modulated by the signal impressed upon the integrator. The present invention discloses the use of a Pockels' Cell to select, under the control of a pseudo-random code, various pulses from a pulse train of an oscillating laser. The present invention then adds an information signal to the output of the Pockels' cell. The additive signal is then transmitted to a recipient who knows the pseudo-random code. U.S. Pat. No. 5,157,542 does not disclose such a spread-spectrum communications system.

SUMMARY OF THE INVENTION

It is an object of the present invention to realize a wideband spread-spectrum communications system.

It is another object of the present invention to realize a wideband spread-spectrum communications system using optical techniques.

These objects are achieved by disclosing a wideband spread-spectrum communications system that relies on optical devices rather than electronic devices.

The present invention employs an oscillating laser beam which produces a jitter-free optical pulse train in the frequency range of 100 MHz and having a rise time in the range of 10 ps to 100 ps.

The oscillating output of the laser is transmitted to a Pockels' Cell. The Pockels' Cell is used to select particular pulses from the pulse train produced by the laser. A pseudo-random code is transmitted to the Pockels' Cell to select the particular pulses. The code makes the pulse spacing appear uncorrelated, giving the optical pulse train the appearance of shot noise. The output of the Pockels' Cell can be said to be a "time-hopped" pulse train. The data rate of the code determines the repetition rate of the selected pulses. This repetition rate is in the range of 1 KHz.

The output of the Pockels' Cell is transmitted to a delay cell. A time delay in the range of 0–200 ps may be added to each optical time-hopped pulse. One way to achieve this delay is with a mirror and a piezoelectric translator. The added delay time is turned on and off by a signal to the piezoelectric translator. The signal controlling the delay cell is the information signal intended to be transmitted to and recovered by the receiver. A digital one coming out of the delay cell indicates that no delay was added (i.e., the delay cell was turned off by the control/information signal) whereas a digital zero coming out of the delay cell indicates that a delay was added (i.e., the delay cell was turned on by the control/information signal). Thus, the output of the delay cell is both time-hopped and time-shift-keyed. The output of the delay cell triggers an ultra wideband photoconductive switch. This switch may be realized with a silicon photoconductive switch. The photoconductive switch converts optical signals into electromagnetic signals which can be broadcast. The output of the photoconductive switch is connected to an antenna which is used to broadcast the electromagnetic signal.

The temporal shape of the radiated pulse is determined by the design of the antenna, but the pulse is always radiated without jitter with respect to the optical trigger pulse. The antenna may be realized with a short "bowtie" antenna. The transmitted signal is intended to be received and understood only by the intended recipient.

A receiver includes an antenna for receiving the signal radiated from the antenna in the transmitter. The output of the receiver antenna is connected to a photoconductive switch.

The photoconductive switch in the receiver samples the voltage across the antenna and converts the signal to an optical signal. The photoconductive switch in the receiver is controlled by a signal that is identical to and synchronized with the output of the Pockels' Cell in the transmitter. Such a signal can be generated in the receiver by including an oscillating laser and a Pockels' Cell as in the transmitter. When the laser in the receiver is synchronized with the laser in the transmitter and the Pockels' Cell in the receiver is controlled by the same pseudo-random code, in synchronization with the code in the transmitter, the receiver extracts the information signal used in the transmitter to control the delay cell.

Initial synchronization may be achieved by transmitting the pseudo-random code and synchronization information over a narrow-band channel prior to transmitting the spread-spectrum signal.

If the received signal is coincident with the optical pulse (i.e., a digital one), a significant voltage is produced across the photoconductive switch in the receiver. If the transmitted signal is delayed (i.e., digital zero), no significant voltage appears across the photoconductive switch.

The output of the photoconductive switch in the receiver is filtered to remove unwanted noise signals that may have corrupted the signal during transmission. A threshold detector is then used to regenerate the information signal.

DETAILED DESCRIPTION

Figure 1:
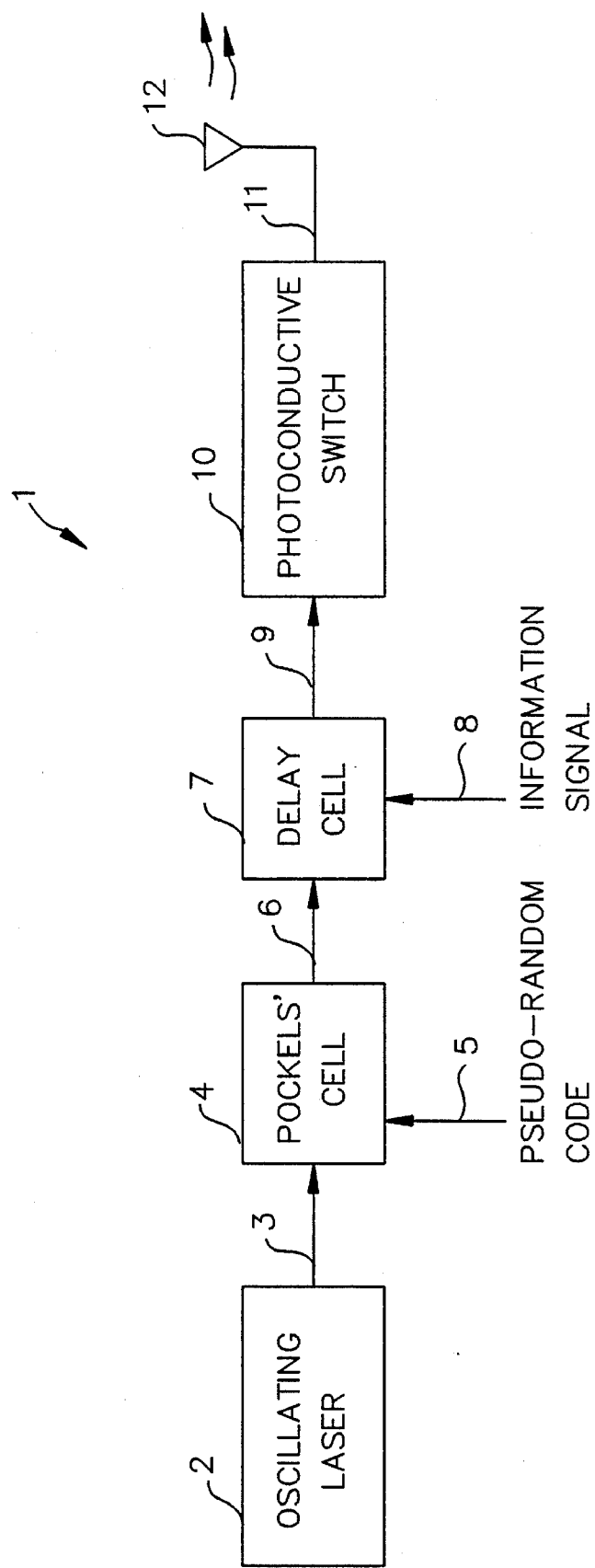
FIG. 1 is a schematic of the transmitter of the present invention.

FIG. 1 illustrates the transmitter 1 of the present invention. An oscillating laser 2 produces an oscillating jitter-free optical pulse train in the frequency range of 100 MHz having a rise time in the range of 10 ps to 100 ps.

The output 3 of the oscillating laser 2 is connected to a Pockels' Cell 4. The Pockels' Cell 4 is used to select particular pulses from the pulse train produced by the oscillating laser 2. A pseudo-random code is transmitted via input 5 to the Pockels' Cell 4. The pseudo-random code is used to select particular pulses of the output 3 of the oscillating laser 2. The code makes the pulse spacing appear uncorrelated, giving the optical pulse train the appearance of shot noise. The output 6 of the Pockels' Cell 4 can be said to be a "time-hopped" pulse train. The data rate of the code determines the repetition rate of the selected pulses. This repetition rate is in the range of 1 KHz.

The output 6 of the Pockels' Cell 4 is connected to a delay cell 7. A time delay in the range of 0–200 ps may be added to each optical time-hopped pulse coming out of the Pockels' Cell 4. One way to achieve this delay is with a mirror that is optically aligned to a piezoelectric translator. The added delay time is turned on and off by a signal connected to the delay cell 7 via input 8. The input 8 to the delay cell is the information signal intended to be transmitted to the recipient in spread-spectrum form.

A digital one coming out of the delay cell 7 indicates that no delay was added (i.e., the delay cell was turned off by the control/information signal 8) whereas a digital zero coming out of the delay cell 7 indicates that a delay was added (i.e., the delay cell was turned on by the control/information signal 8). Thus, the output 9 of the delay cell 7 is both time-hopped and time-shift-keyed.

The output 9 of the delay cell 7 is connected to an ultra wideband photoconductive switch 10. The photoconductive switch 10 converts optical signals to electromagnetic signals for broadcasting. The photoconductive switch 10 may be realized with a silicon photoconductive switch. The output 11 of the photoconductive switch 10 is connected to an antenna 12.

The antenna 12 broadcasts the output of the photoconductive switch 10. The temporal shape of the radiated pulse is determined by the design of the antenna 12, but the pulse is always radiated without jitter with respect to the optical trigger pulse produced by the output 3 of the oscillating laser 2. The antenna 12 may be realized with a short "bowtie" antenna. The transmitted signal is intended to be received and understood only by the intended recipient.

Figure 2:
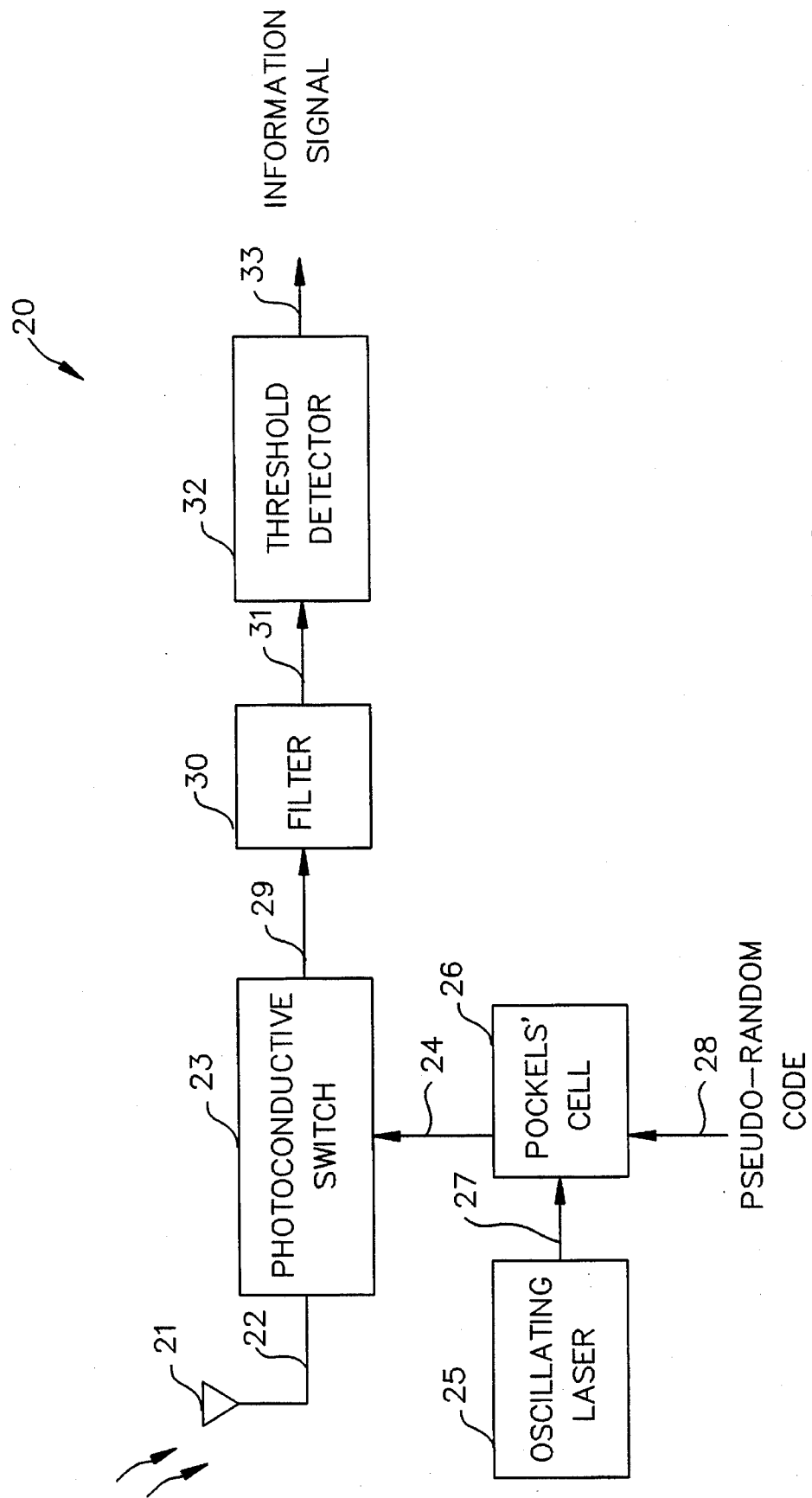
FIG. 2 is a schematic of the receiver of the present invention.

FIG. 2 illustrates a receiver 20 intended to receive the spread-spectrum signal transmitted by the transmitter 1 of FIG. 1. The receiver 20 includes an antenna 21 for receiving the signal radiated from the antenna 12 of the transmitter 1 of FIG. 1. The output 22 of the antenna 21 in the receiver 20 in FIG. 2 is connected to a photoconductive switch 23.

The photoconductive switch 23 in the receiver 20 samples the voltage across the antenna 21 and produces an optical signal. The photoconductive switch 23 is controlled by a signal 24 that is identical to and synchronized with the output 6 of the Pockels' Cell 4 in the transmitter 1 in FIG. 1. Such a signal 24 can be generated in the receiver 20 by including an oscillating laser 25 connected to a Pockels' Cell 26 via an output 27 of the oscillating laser 25 as in the transmitter. When the laser 25 in the receiver 20 is synchronized with the laser 2 in the transmitter 1 in FIG. 1 and the Pockels' Cell 26 in the receiver 20 in FIG. 2 is controlled by the same pseudo-random code via input 28 to the Pockels' Cell 26, in synchronization with the code in the transmitter 1, the receiver 20 extracts the information signal 8 used in the transmitter 1 to control the delay cell 7 in the transmitter 1.

Initial synchronization may be achieved by transmitting the pseudo-random code and synchronization information used in the transmitter 1 over a narrow-band channel prior to transmitting the spread-spectrum signal. If the received signal via the antenna 21 in the receiver 20 in FIG. 2 is coincident with the optical pulse appearing at the output 24 of the Pockels' Cell 26 (i.e., a digital one), a significant voltage is produced across the photoconductive switch 23 in the receiver 20. If the transmitted signal is delayed (i.e., digital zero), no significant voltage appears across the photoconductive switch 23.

The output 29 of the photoconductive switch 23 is connected to a filter 30 to remove unwanted noise signals that may have corrupted the signal received by the receiver 20. The output 31 of the filter 30 is connected to a threshold detector 32 which regenerates the information signal. The information signal recovered from the spread-spectrum signal transmitted by the transmitter 1 appears at the output 33 of the threshold detector 32.

Figure 3:
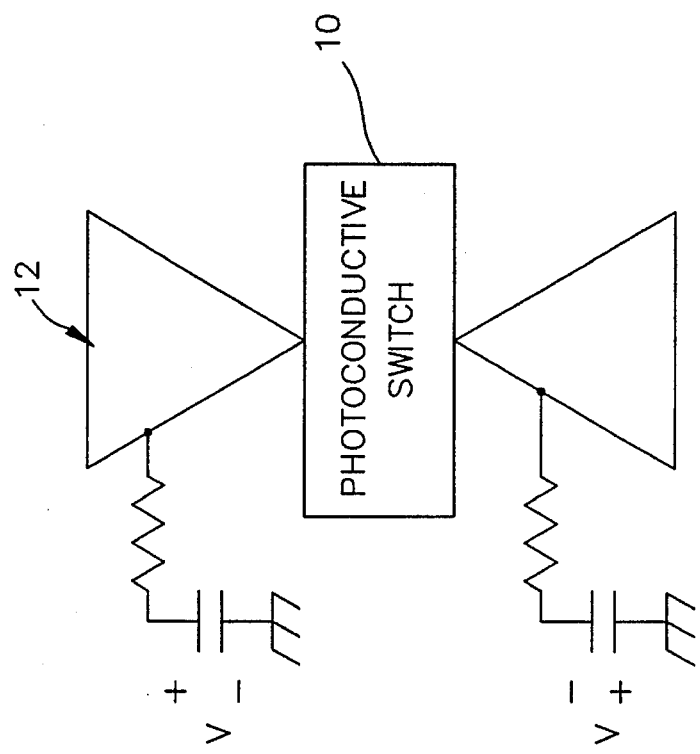
FIG. 3 is an illustration of the antenna used in the transmitter of the present invention.

FIG. 3 illustrates the antenna 12 used in the transmitter 1 of FIG. 1. The antenna 12 consists of a conductor shaped as a bowtie. The antenna 12 is connected to the photoconductive switch 10.

Figure 4:
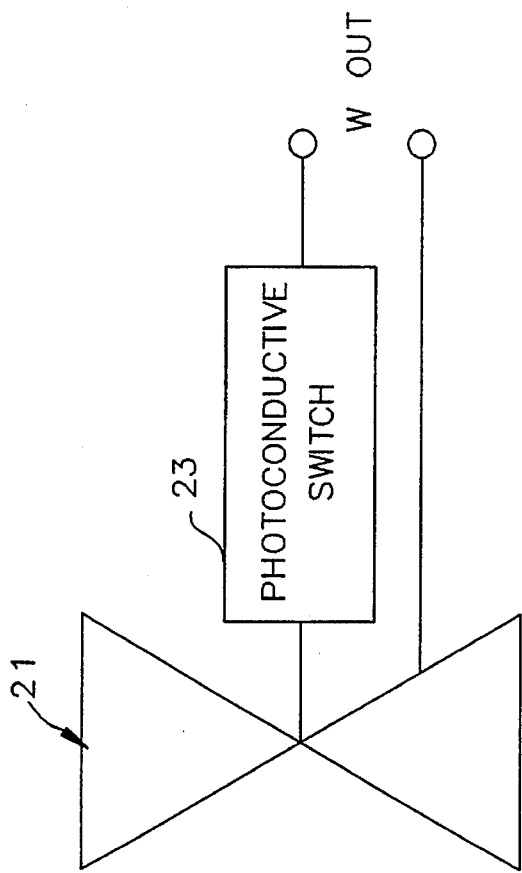
FIG. 4 is an illustration of the antenna used in the receiver of the present invention.

FIG. 4 illustrates the antenna 21 used in the receiver 20 of FIG. 2. The antenna 21 consists of a conductor shaped as a bowtie. The antenna 21 is connected to the photoconductive switch

What is claimed is:

1. A photoconductive spread-spectrum communications system transmitter, comprising:
    a) an oscillating laser for generating an oscillating optical signal, having an output at which appears the oscillating optical signal;
    b) a Pockels' cell for selecting pulses from the oscillating optical signal, having a first input connected to the output of said oscillating laser, having a second input for receiving a pseudo-random code, and having an output at which appears a pulse train consisting of pulses selected from the output of said oscillating laser;
    c) a delay cell for adding an information signal to the output of said Pockels' Cell, having a first input connected to the output of said Pockels' Cell, having a second input for receiving the information signal, and having an output at which appears the output of said Pockels' Cell combined with the information signal;
    d) a photoconductive switch for converting optical signals to electromagnetic signals, having an input connected to the output of said delay cell, and an output; and
    e) an antenna for transmitting electromagnetic signals, having an input connected to the output of said photoconductive switch.

2. The device of claim 1, wherein said delay cell comprises:
    a) a mirror; and
    b) a piezoelectric translator in optical alignment with said mirror.

3. The device of claim 1, wherein said photoconductive switch is comprised of a silicon photoconductive switch.

4. The device of claim 1, wherein said antenna comprises a bowtie antenna.

5. The device of claim 2, wherein said photoconductive switch is comprised of a silicon photoconductive switch.

6. The device of claim 5, wherein said antenna comprises a bowtie antenna.

7. A method of transmitting a photoconductive spread-spectrum signal, comprising the steps of:
    a) generating an oscillating optical signal;
    b) selecting pulses from the oscillating optical signal of step (a) under control of a pseudo-random code;
    c) adding an information signal to the result of step (b);
    d) converting the result of step (c) to an electromagnetic signal; and
    e) transmitting the result of step (d).

8. A photoconductive spread-spectrum communications system receiver, comprising:
    a) an oscillating laser for generating an oscillating optical signal, having an output at which appears the oscillating optical signal;
    b) a Pockels' cell for selecting pulses from the oscillating optical signal, having a first input connected to the output of said oscillating laser, having a second input for receiving a pseudo-random code that was used by a corresponding transmitter, and having an output at which appears a pulse train consisting of pulses selected under control of the pseudo-random code from the output of said oscillating laser;

c) an antenna for receiving a spread-spectrum signal;

d) a photoconductive switch for converting optical signals to electromagnetic signals, having an input connected to said antenna, and having an output;

e) a filter for filtering noise, having an input connected to the output of said photoconductive switch, and having an output; and f) a threshold detector connected to the output of said filter for regenerating the information signal.

9. The device of claim 8, wherein said photoconductive switch is comprised of a silicon photoconductive switch.

10. The device of claim 8, wherein said antenna comprises a bowtie antenna.

11. A method of regenerating a signal transmitted as a photoconductive spread-spectrum signal, comprising the steps of:

a) generating an oscillating optical signal;

b) selecting pulses from the oscillating optical signal of step (a) under control of a pseudo-random code;

c) receiving an electromagnetic spread-spectrum signal;

d) converting the electromagnetic signal received in step (c) to an electrical signal under control of the pulses selected in step (b);

e) filtering the result of step (d); and f) regenerating an information signal embedded in the transmitted spread-spectrum signal.

* * * * *